No. 800,402. PATENTED SEPT. 26, 1905.
E. ROWART & L. FRANCQ.
PROCESS AND APPARATUS FOR THE MANUFACTURE OF SHEET GLASS.
APPLICATION FILED APR. 12, 1904.
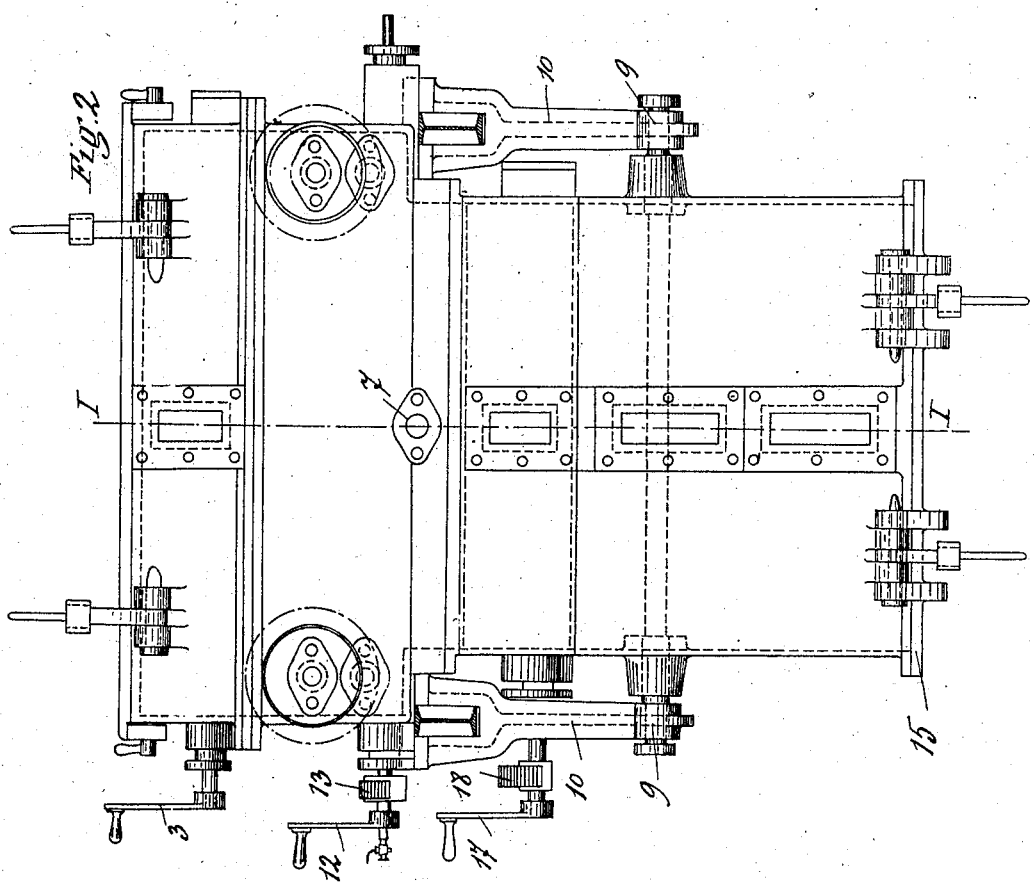
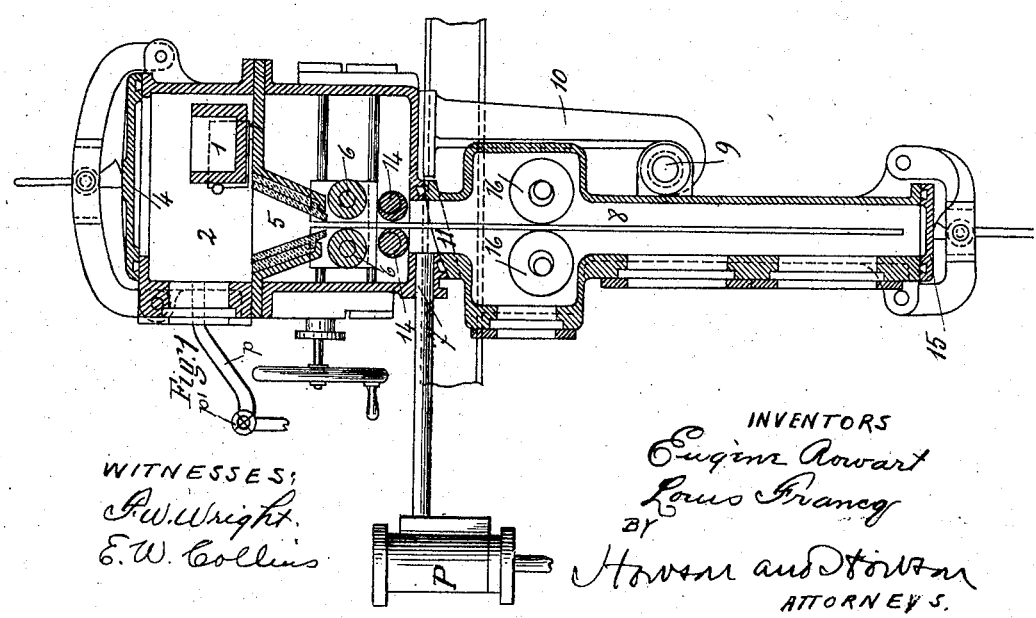
WITNESSES:
P. W. Wright.
E. W. Collins.
INVENTORS
Eugène Rowart
Louis Francq
BY
Howson and Howson
ATTORNEYS.

UNITED STATES PATENT OFFICE.

EUGÈNE ROWART, OF AUVELAIS, AND LOUIS FRANCQ, OF OBOURG, BELGIUM.

PROCESS AND APPARATUS FOR THE MANUFACTURE OF SHEET-GLASS.

No. 800,402. Specification of Letters Patent. Patented Sept. 26, 1905.

Application filed April 12, 1904. Serial No. 202,854.

*To all whom it may concern:*

Be it known that we, EUGÈNE ROWART, works manager, residing at Auvelais, and LOUIS FRANCQ, doctor of medicine, residing at Obourg, Belgium, have invented a Process and Apparatus for the Manufacture of Sheet-Glass, of which the following is a specification.

This invention relates to an improved process and apparatus for making glass, and has for its object to improve the structure of the glass as it is being formed into sheets. Broadly considered, we secure this object by forming the sheet-glass in a chamber from which the atmosphere has been withdrawn, so as to cause the glass to slowly cool by radiation, thus avoiding rapid surface cooling of the sheets.

The invention consists in causing the melted glass to flow from a receptacle through a narrow opening into a chamber which has previously been exhausted of air, so that the sheet of glass thus formed is only cooled by radiation, being only in contact at certain points with bad conductors of heat.

For carrying out this process we employ apparatus which we will describe with reference to the accompanying drawings, in which—

Figure 1 shows a cross-section of the apparatus on line I-I, Fig. 2, which shows a front elevation of the apparatus.

The melted glass is contained in a vessel 1, heated to a sufficient temperature to prevent the cooling of the glass, which is placed in a chamber 2 upon a support which by means of an external crank-handle 3 can be turned so as to tilt the vessel. The chamber is then closed hermetically by means of a cover 4. The chamber contains a hopper 5, the internal surfaces of which are lined with refractory material which is a bad conductor of heat and which may be coated with a second material that is also a bad heat-conductor and that can be moistened. This hopper is situated above a pair of horizontal parallel rollers 6 of a bad conductor of heat, which may be moistened or not and the distance apart of which can be regulated at will, according to the thickness which it is desired to impart to the sheet of glass.

The chamber 2 is situated above a lower chamber 8, which can turn upon pivots 9, carried by supports 10. The upper opening 11 of this chamber is adapted to form an air-tight joint with the bottom opening of chamber 2 when the chamber 8 is turned into its vertical position, as shown at Fig. 1. When the apparatus is thus arranged, sufficient melted glass is run into the vessel 1 when placed on the tilting support to produce a sheet of the desired size. The chamber 2 is then closed by its cover 4, and the air is exhausted from chamber 8 by means of an air-pump P or other suitable device which is connected to the branch pipe 7. When the glass in the vessel 1 is of the correct temperature to have the proper viscosity to enable it to be formed into a sheet, the vessel is tilted so that the glass flows into the hopper 5, whence it passes in a continuous uniform layer between the rollers 6, which, in order to turn with as little resistance as possible, have their journals mounted in ball-bearings. If necessary, the glass may be forced through the rollers by admitting steam, water, air, or gas under pressure by the pipe *p* and valve *p'* into chamber 2 above the hopper 5 after the glass has been run into the latter. During the passage of the glass between the rollers and its descent below these it loses sufficient heat by radiation to become so solid as to maintain its shape in the vacuum of the lower chamber. When this has taken place, the crank-handle 12 is turned, which by means of intermediate gear 13 causes the rotation of two eccentric rollers 14, so as in approaching each other to nip the sheet of glass along its entire width. These rollers are hollow, and water is circulated through them so as to cool them. The glass sheet being thus suspended from the rollers free of contact with the walls of the chamber 8 is then allowed to cool sufficiently to become hardened, after which air is admitted to the chamber 8 and the bottom door 15 of this is opened. In order to regulate at will the descent of the glass sheet when the rollers 14 have been turned so as to liberate it, the sheet is slightly nipped between two pairs of eccentric disks 16, situated on each side thereof and actuated by a crank-handle 17 and toothed gear 18. The joint between the chambers 2 and 8 is then loosened, and 8 is then turned upon its pivots 9 into a horizontal position, so that the sheet of glass can be drawn out from the lower end thereof, after which the apparatus is brought back to its original condition for repeating the above-described process.

We claim as our invention—

1. The herein-described process of manufacturing sheet-glass, consisting in forming the melted glass into a sheet in a chamber exhausted of air, and keeping the sheet free of contact with the walls of the chamber.

2. The herein-described process of manufacturing sheet-glass, consisting in placing the melted glass into a chamber, exhausting the air from said chamber, and then forming the melted glass into a suspended sheet in the vacuum formed, the sheet being free of contact with the walls of the chamber.

3. The herein-described process of manufacturing sheet-glass, consisting in first inclosing the melted glass in a closed receptacle with the surface of the glass exposed to the interior of the receptacle, but out of contact with the walls thereof, exhausting the air from the receptacle, and forming the glass into a sheet in the vacuum thus formed.

4. Apparatus for the manufacture of sheet-glass, comprising an air-tight chamber in two parts, the upper part adapted to accommodate a movable hopper and a passage therefrom into the lower part, and means for upsetting the hopper to pour its contents into such passage, in combination with means by which said chamber may first be exhausted of air.

5. Apparatus for the manufacture of sheet-glass, comprising an air-tight chamber in two parts, the upper part adapted to accommodate a hopper and a passage therefrom into the lower part, and means for upsetting the contents of the hopper into such passage, in combination with means by which said chamber may first be exhausted of air, and means for admitting fluid under pressure to the upper part of said chamber after the upsetting of the hopper.

6. Apparatus for the manufacture of sheet-glass, comprising an air-tight chamber in two parts, the upper part adapted to accommodate a hopper and a passage therefrom into the lower part, and means for upsetting the contents of the hopper into such passage, said lower chamber being pivoted and adapted to be released from said upper chamber so as to be swung free from the same, in combination with means by which said chamber may first be exhausted of air.

7. Apparatus for the manufacture of sheet-glass, comprising an air-tight chamber in two parts, the upper one adapted to contain melted glass, a passage therefrom into the other part, and means for rolling the glass into a sheet and passing it from the part in which it was held to the other part, in combination with means by which said chamber may first be exhausted of air.

8. Apparatus for the manufacture of sheet-glass, comprising an air-tight chamber in two parts, the upper part adapted to receive the molten glass, a pair of rollers between the two parts to roll the molten glass into the lower part and means for exhausting air from the chamber.

9. Apparatus for the manufacture of sheet-glass, comprising an air-tight chamber in two parts, the upper part adapted to receive the molten glass, a pair of rollers between the two parts to roll the glass into a sheet, means for gripping and holding the sheet in the lower part and means for exhausting the air from the chamber.

In testimony whereof we have signed our names to this specification in the presence of two subscribing witnesses.

EUGÈNE ROWART.
LOUIS FRANCQ.

Witnesses:
GUSTAVE PIERRY,
GREGORY PHELAN.